Patented Oct. 30, 1934

1,979,151

UNITED STATES PATENT OFFICE 1,979,151

MANUFACTURE OF ALKALI CARBONATE OR ALKALI HYDROXIDE

Hermann Fricke and August Meier, Munich, Germany, assignors to Alterum Kredit-Aktien-Gesellschaft, Berlin, Germany, a company of Germany No Drawing. Application June 27, 1932, Serial No. 619,614. In Germany July 15, 1931

3 Claims. (Cl. 23—63)

The invention relates to a modified process of manufacturing alkali carbonate or alkali hydroxide after the manner of the Leblanc soda process, with the recovery of ammonia as by-product, in which alkali sulphate in admixture with carbon (or carboniferous material) is converted into alkali cyanide by the action of nitrogen at a high temperature, and the said alkali cyanide is hydrolyzed for the manufacture of alkali carbonate or alkali hydroxide with the recovery of ammonia as a by-product.

According to the invention, the alkali sulphate carbon mixture is treated in known manner at an elevated temperature with steam and carbon dioxide and is then subjected to cyanization.

As is known, by the treatment of alkali sulphate-carbon mixtures with steam and carbon dioxide at about 500° to 800° C., the alkali sulphate is converted into alkali carbonate, while the sulphur component is liberated in the form of sulphuretted hydrogen. As shown in experiments, the result of this pre-treatment or transformation is that the conversion of the alkali-carbon mass into alkali cyanide is simple to carry out and is surprisingly good. Evidently, by the removal of sulphur which takes place in the pre-treatment, the mixture is brought into a state in which it affords, to the subsequent action of the nitrogen, excellent conditions for the conversion into cyanide.

This satisfactory behaviour of the mixture is probably to be explained by the fact that, during pre-treatment, the structure of the reaction mass becomes extremely porous and full of small passages and pipes. The chemical changes, for example for sodium sulphate, take place according to the following known equations:

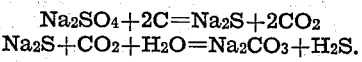

$$Na_2SO_4 + 2C = Na_2S + 2CO_2$$
$$Na_2S + CO_2 + H_2O = Na_2CO_3 + H_2S.$$

Therefore, during the removal of sulphur, there is a large proportion of gaseous substances which in part enter the reaction mass and in part escape therefrom. Since the mixture of alkali sulphate and carbon always contains both reaction substances in a finely divided form, it follows that the formation of a highly porous structure is necessarily a resultant phenomenon of the pre-treatment. Since, however, it is known that the form or state of an alkali-carbon mixture is an important factor in the action of nitrogen during the cyanization process, it may well be deduced from the surprisingly satisfactory results that the special structure formed in the mixture by the pre-treatment results in the surprising technical advantage which has been found.

As compared with the processes employed heretofore for the preparation of alkali cyanide from alkali sulphate, there is first of all the advantage that it is possible to carry out the new process without the addition of lime.

The most important advantage of the new process, however, resides more particularly in the fact that there is no necessity to purify the alkali product obtained by the steam-carbon dioxide treatment (carbonation), but that it is the impure product which is worked up further.

Further, an important advantage also resides in the fact that, due to its porous nature, the reaction mass permits considerably easier and better lixiviation after hydrolysis, than is the case with Leblanc crude soda.

The reaction mass may be employed with particular advantage in the briquetted form, thereby securing the advantage of a very compact charging of the individual constituents, in addition to that of a very effective porosity of the mass. In the experiments made it has been found that, generally, the briquettes possess sufficient strength even without the addition of a binding agent.

In the experiments, cyanide was prepared in an amount of about 80% of the theoretically possible quantity in a few hours at moderate temperatures (850° to 950° C.) without the use of any special catalyst and without, up to the present, any occasion to conduct the experiments in a manner more exactly adapted to the substances employed. Thus it is possible to avoid the use of a catalyst such as iron, and in this way avoid impurities in the finally obtained alkali occasioned by the presence of compounds of such catalyst.

Example I

For the manufacture of sodium carbonate, 1,000 kilograms of sodium sulphate (of 98% purity) are mixed with 2,750 kilograms of brown coal (referred to the dry substance) and ground to the fineness of powder. Due to the moisture of the brown coal and to special additions of water, the mixture has a moisture content of 16% of the total mass. The powdered mass is pressed to small briquettes and charged into a shaft furnace which is adapted to be heated.

After charging the shaft furnace, the mass is heated to about 900° C., the sulphate being thereby reduced to sulphide. When the reduction is completed, which is indicated by the fact that no more CO₂ and CO gases are given off, the heating is so regulated that the furnace contents have a temperature of only 400° to 500° C.

At the lower temperature (400° to 500° C.) carbon dioxide and steam are passed through the mass of briquettes in order to convert the sodium sulphide into carbonate and to expel the sulphur as sulphuretted hydrogen, according to the equation:

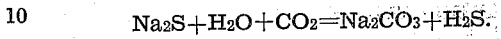
$$Na_2S + H_2O + CO_2 = Na_2CO_3 + H_2S.$$

The steam and carbon dioxide are preferably employed in excess. Generally, of course, the carbon dioxide obtained in the previous reduction is also employed.

The mass is then heated again to a higher temperature and at the same time nitrogen is allowed to act upon the briquettes. The action of the nitrogen, which takes place at about 1,000° C., affects the conversion into sodium cyanide.

After the cyanization is completed, the mass is removed from the furnace and is transferred to a container in which hydrolysis is carried out at about 400° C. During the action of the steam on the cyanide, 190 kilograms of ammonia escape and are collected in water in known manner.

After hydrolysis, the cooled mass is introduced into a lixiviating tank and the soda is extracted by water. The solid residue and the liquor are separated in known manner and the liquor is freed if desired from any impurities it may contain. 690 kilograms of sodium carbonate of a purity of 98% are recovered from the liquor.

The solid residue consisting of carbon and ash, is employed for heating purposes. The sulphuretted hydrogen formed by the action of carbon dioxide and steam on the sulphide is burnt in known manner for the formation of sulphur dioxide, which is then converted into sulphuric acid by the contact process. 560 kilograms of sulphuric acid are thereby obtained.

The interaction of this sulphuric acid with the ammonia recovered in the hydrolysis produces 750 kilograms of ammonium sulphate.

*Example II*

Briquettes of the same raw material as in Example I were subjected to the same treatment, as far as cyanization, as in Example I.

Thereupon, the reaction mass, broken up and spread out in thin layers on shallow pans, was introduced into a hydrolysis container. Hydrolysis was then carried out by passing steam over the layers at a temperature of between 400 and 500° C.

In this hydrolysis, 166 kilograms of ammonia were recovered. The reaction mass contained 271 kilograms NaOH and 262 kilograms of Na₂CO₃. In addition, apart from traces of aluminate, silicate and the like, the mass still contained about 10% of the introduced sulphate as alkali sulphur compounds.

The reaction mass was then separated into the different constituents and worked up in known manner by lixiviation, crystallization of the Na₂CO₃ (Na₂CO₃ with water of crystallization), separation of the impurities and recovery of the sulphur compounds, and concentration of the caustic soda by evaporation.

*Example III*

For the purpose of making potassium carbonate and potassium hydroxide, 1,000 kilograms of potassium sulphate of 95% purity are mixed with 1,850 kilograms of bituminous coal, are ground to the fineness of powder and are pressed to small briquettes.

The mass is then reduced by heating it in a shaft furnace to about 900° C. and after completion of the reduction is carbonated at a temperature of 400-500° C. by carbon dioxide and steam.

Thereupon, the mass is again heated to a high temperature of about 900° C. in a shaft furnace and subjected to the action of nitrogen.

The reaction mass is then broken up and spread out in thin layers on shallow pans and treated at about 400 to 500° C. with steam, 139 kilograms of ammonia being thereby recovered. After this hydrolysis, the reaction mass contains 325 kilograms of KOH and 275 kilograms of K₂CO₃, together with about 8% of the introduced sulphate as alkali sulphur compounds, and traces of aluminate, silicate and the like.

The carbonate and hydroxide constituents of the reaction mass are then separated and purified in a known manner, and sent away as saleable products, while the alkali sulphur compounds are re-introduced into the process.

We claim:

1. A process of manufacturing an alkali of the group including alkali metal carbonates and hydroxides, which comprises mixing and briquetting the corresponding sulphate with carboniferous material, heating to approximately 900° C. for effecting a reduction to sulphide and the forming of pores in the briquettes by the evolution of gases formed in the reduction, heating to between 400 and 500° C. while passing carbon dioxide and steam for effecting a carbonation, heating at aproximately 900° to 1000° C. while passing nitrogen for effecting a cyanization, said heatings being accomplished in the substantial absence of a catalyst and while maintaining the porous structure of the briquettes, thereafter hydrolyzing at approximately 400° C., and lixiviating the solid material with water whereby to obtain a substantially pure alkali free from compounds of the catalyst.

2. A process of manufacturing an alkali of the group including alkali metal carbonates and hydroxides, which comprises briquetting the corresponding sulphate in admixture with carboniferous material, heating to approximately 900° to 1000° C. for effecting a reduction to sulphide and the forming of pores in the briquettes by the evolution of gases formed in the reduction, heating to between 400 and 500° C. while passing carbon dioxide and steam for effecting a carbonation, heating to approximately 900° while passing nitrogen for effecting a cyanization, said heatings being accomplished without removal of the material from the furnace whereby to avoid loss of porosity of the mass and in the substantial absence of a catalyst reactive with the alkali to be produced, thereafter hydrolyzing at approximately 400° C., and lixiviating the solid material with water whereby to obtain a substantially pure alkali free from compounds of the catalyst, wherein the porosity resulting from the escape of gas from the briquettes during reduction is maintained through the procedure and availed of during lixiviation for facilitating the solution of said alkali.

3. A process of manufacturing an alkali metal hydroxide which comprises mixing and briquetting the corresponding sulphate with carboniferous material, heating to approximately 900° C. for effecting a reduction to sulphide and the forming of pores in the briquettes by the evolution of gases formed in the reduction, heating to between 400 and 500° C. while passing carbon dioxide and steam for effecting a carbonation, heating at approximately 900 to 1000° C. while passing nitrogen for effecting a cyanization, while maintaining the porous structure of the briquettes, thereafter hydrolyzing at approximately 400° C. in thin layers, and lixiviating the solid material with water whereby to obtain the alkali metal hydroxide.

HERM. FRICKE.
AUGUST MEIER.